United States Patent Office 2,940,924
Patented June 14, 1960

2,940,924
IMPREGNATED PLATINUM-ALUMINA CATALYSTS

Harry M. Brennan, Hammond, Ind., and Edmund Field, Chicago, Ill., assignors to Standard Oil Company, Chicago, Ill., a corporation of Indiana No Drawing. Filed Nov. 30, 1955, Ser. No. 560,276

11 Claims. (Cl. 208—138)

This invention relates to the conversion of hydrocarbons, and more particularly to the catalytic hydroforming of petroleum naphthas. Specifically, the invention relates to an improved alumina-supported platinum catalyst and to the manufacture of high-octane gasolines therewith.

We have discovered a method for the preparation of platinum-impregnated alumina catalysts which involves only a single calcination, compared with the two or three calcinations required by the methods of the prior art. It is accordingly an object of our invention to provide an improved technique for the preparation of platinum-alumina catalysts. Another object is to prepare platinum-alumina composites of improved catalytic properties. A further object is to improve the conversion of hydrocarbons, and in particular to improve the hydroforming of petroleum naphthas. These and other objects of our invention will be apparent from the following description thereof.

In the preparation of impregnated platinum-alumina catalysts, it is conventional to preform the alumina into shapes as desired, prior to impregnation thereof with platinum. In order to effect such preforming, it has heretofore been necessary to subject the alumina to a preliminary calcination at elevated temperatures of around 800 to 1200° F. for around 3 to 24 hours or more, then crush it to a powder, and add a lubricating medium, such as "Sterotex" (a hydrogenated coconut oil) or the like. Only thereafter can the alumina be successfully pelleted or otherwise formed into shapes by application of pressure in a conventional tableting machine. The resulting pellets must again be calcined prior to impregnation with platinum in order to increase the mechanical strength thereof and to remove the pelleting lubricant, which would otherwise tend to repel the impregnating solution and to prevent the penetration thereof into the alumina particles. After impregnation, the pellets must again be dried and calcined, making a total of three calcinations for the complete procedure.

In our improved technique, we start with "peptized" alumina—i.e., alumina which has been subjected to treatment with a mild acid to convert at least a small proportion thereof into colloidal form. The peptized alumina is subjected to "alkali-aging" (as hereinafter more fully defined) at a pH between about 8.5 and 12 for a period of 1 to 24 hours or more, and is thereafter dried to a volatiles content less than about 50 percent, wet basis, this procedure being in accordance with an earlier development by ourselves in collaboration with Roy W. Vander Haar. The resulting alumina, we have observed, can be successfully pelleted (after incorporation of a lubricant) without a preliminary calcination, and we have further observed that the resulting pellets can be successfully platinum-impregnated without a preliminary calcination by employing a solution of a platinum compound in an organic liquid which is capable of wetting or dissolving the pelleting lubricant. The impregnated pellets are thereafter dried, suitably at a temperature between about 200 and 400° F. for a period of about 6 to 24 hours, and are then calcined at 800 to 1200° F. for 1 to 24 hours, optimally around 1000 to 1100° F. for 2 to 6 hours.

Our invention thus comprises the steps of exposing an alumina hydrosol or other form of peptized alumina to alkaline conditions within the range of about pH 8.5 to 12 for 1 to 24 hours or more, drying the alkali-treated alumina to a volatiles content less than about 50 percent by weight, wet basis, combining the dried alumina with a lubricant, pelleting, impregnating the pellets with a non-aqueous platinum-containing solution, and finally drying and calcining. This technique, it will be observed, involves only a single calcination.

Alumina hydrosols can be prepared by a number of methods, such as by hydrolyzing aluminum acetate or an aluminum alkoxide in an aqueous medium under controlled conditions, digesting hydrous alumina in dilute acid, and the like. Alumina hydrosols are most conveniently prepared, however, by the technique described in Heard Re. 22,196 (October 6, 1942). According to this technique, aluminum metal in the form of sheets, granules, turnings, sawdust, chips, shot, rings, irregular shapes, or the like, is subjected to amalgamation by contact with mercury or an aqueous solution of a mercury salt. The amalgamated aluminum is then digested in water in the presence of a low concentration (suitably around 2 percent by weight) of acetic acid or other weak organic acid as a peptizing agent. The reaction goes forward readily at ordinary or autogenous pressures and at temperatures above about 100° F., preferably between about 125 and 210° F. Thick, viscous hydrosols can be obtained at temperatures above 160° F., while relatively thin hydrosols are obtained at temperatures below 160° F. The mixture of amalgamated aluminum and acidulated water is preferably agitated in order to improve the contact of the reacting materials and to assist in breaking the layer of froth which is ordinarily formed by the hydrogen liberated in the reaction. A reflux condenser is advantageously employed to condense water and acid vapors from the emerging hydrogen stream and to return the resulting condensate to the reaction vessel. The reaction gradually slows down after about 24 hours and ordinarily ceases for all practical purposes after about 30 hours. The reaction product is thereafter clarified by settling, centrifugation, filtration, or the like, to remove any suspended solids, including particles of metallic mercury. The hydrosol product is a syrupy liquid of opalescent, nearly transparent appearance, containing from around 2 to 10 percent by weight of $Al_2O_3$.

Another form of peptized alumina suitable for use as the starting material in our invention can be prepared by a modification of the Heard technique, omitting the weak organic acid peptizing agent in the digestion of the amalgamated aluminum, so that a slurry of hydrous alumina is obtained, separating the hydrous alumina, and thereafter digesting the hydrous alumina with acetic acid or other weak organic acid to peptize the alumina. The resulting suspension or slurry can be treated according to our process to prepare an improved platinum-alumina catalyst.

In one embodiment of our invention, a Heard-type alumina hydrosol or other suitably prepared form of peptized alumina is agitated and commingled with an alkaline substance, preferably ammonia or ammonium hydroxide, in a quantity sufficient to raise the pH above about 8.5, but insufficient to convert any considerable proportion of the alumina into an aluminate salt. We ordinarily operate at a pH no higher than the maximum level obtainable by adding ammonia to the system under pressure (i.e., below about pH 12), and we prefer to operate in the range of about pH 10 to 11. The alkalized hydrosol is aged for about one hour or more at about 50 to 250° F., preferably at ordinary temperatures around 70 to 100° F. for 24 hours or more, and optimally for around 2 to 7 days, the shorter aging periods corresponding generally to the higher pH levels and (in lesser degree) to the higher temperatures. During this operation, white, finely divided hydrous alumina forms in the liquid phase as a filterable slurry, the reaction being ordinarily complete in as little as one hour at pH 9.5 or above, whereas a day may be required at pH 9, and 2 to 3 days at pH 8.5. The slurry thus obtained is filtered to separate the hydrous alumina, suitably at an elevated temperature between about 150 and 200° F. in order to ensure a rapid filtration rate. The filter cake is dried at ordinary or elevated temperatures, preferably between about 150 and 400° F., to a volatiles content less than about 50 percent, wet basis, preferably between about 15 and 40 percent. The dried cake is crushed to a powder or fine grains of suitable size (e.g., to pass 30 mesh), combined with a lipophilic lubricant (e.g., around 4 percent of Sterotex), and formed into shapes as desired (e.g., 1/8" x 1/8" cylindrical pellets) in a pelleting machine. The pellets are then impregnated to a platinum level between about 0.05 and 1 percent by weight, based on dry $Al_2O_3$, employing a solution of chloroplatinic acid in a $C_1$–$C_5$ aliphatic alcohol. The impregnated alumina is dried at ordinary or elevated temperatures, suitably between about 150 and 400° F. for 1 to 24 hours as desired, and is finally calcined at 800 to 1200° F., preferably 1000 to 1100° F., for around 2 to 6 hours. The calcination may be carried out in hydrogen or an inert gas such as nitrogen or flue gas, but is preferably carried out in the presence of air to facilitate the removal of the lubricant.

Ammonia or ammonium hydroxide is a highly advantageous material for use as the alkalizing agent for treating peptized alumina in our process. Other nitrogen bases can also be employed for this purpose, including water-soluble amines such as methylamine, dimethylamine, trimethylamine, ethylamines, isopropylamine, diisopropylamine, and furfurylamine, quaternary ammonium hydroxides such as tetramethylammonium hydroxide and benzyltrimethylammonium hydroxide, and the like. Inorganic bases and alkalies such as sodium hydroxide, sodium carbonate, potassium carbonate, calcium hydroxide, and the like may also be employed in quantities carefully limited to avoid excessively high pH levels; but after such materials are used, it is generally desirable to wash the alkali-aged alumina thoroughly to remove the alkali cations therefrom. In all cases, the alkalizing agent must have an ionization constant sufficiently high to permit it to raise the peptized alumina mixture to a pH above about 8.5, and must be used in a sufficient quantity to reach the desired pH level, but insufficient to convert any considerable quantity of the alumina into aluminate salts. On this basis, a pH of around 11.5 is the practical maximum which we ordinarily choose to employ, and can be produced, for example, by adding about two volumes of aqueous 29 percent ammonium hydroxide to one volume of Heard-type alumina hydrosol. In commingling the alumina with the alkalizing agent, it is desirable to employ rapid agitation, dilution, controlled rate of addition, multiple-point addition, and other expedients known to the art to avoid or to minimize effects of localized overtreatment.

The modified alumina obtained by alkali-aging is dried to a volatiles content below about 50 percent by weight, and is converted thereby into a precursor of eta-alumina. The drying is suitably carried out at ordinary or elevated temperatures up to about 400° F., preferably between about 150 and 400° F., and preferably to a volatiles content between about 15 and 40 percent. A drying time of about 1 to 24 hours is ordinarily sufficient, and under favorable conditions a near approach to the equilibrium volatiles content at most temperatures can be achieved in around 5 hours on the average. The approximate equilibrium or near-equilibrium volatiles content of the alumina cake at a series of drying temperatures is set forth in the following table:

| Drying Temperature, °F. | Ratio, $H_2O$:$Al_2O_3$, molar | Volatiles Content, wet basis, wt.-percent |
|---|---|---|
| 220 | 3 | 34.6 |
| 300 | 2.8 | 33.1 |
| 400 | 1 | 15 |

The resulting dried cake, unlike most aluminas known to the prior art, can be pelleted immediately, without a preliminary calcination at high temperature, requiring only pulverization and the addition of a pelleting lubricant.

A variety of lubricants may be employed in pelleting the alumina prepared as described above, such as graphite or lipophilic substances, including Sterotex, stearic acid, rosin, and the like. These materials are commonly employed in a proportion between about 0.5 and 10 percent by weight, based on dry $Al_2O_3$, preferably between about 1 and 4 percent.

The impregnation of alumina pellets, prepared as described above, is complicated by the fact that the lubricant remaining therein tends to retard or prevent the penetration of aqueous platinum solutions as heretofore employed in the art. We have overcome this difficulty by employing substantially non-aqueous impregnating solutions, comprising a platinum compound and a solvent therefor which is likewise capable of wetting or dissolving the lubricant. Suitable platinum compounds include chloroplatinic acid, bromoplatinic acid, iodoplatinic acid, platinum tetrachloride, platinum dichloride, ammonium chloroplatinate, diaminodinitritoplatinum, dichloroethyleneplatinum (II), and the like. A suitable solvent may readily be chosen, depending upon the particular platinum compound and lubricant employed, in accordance with the teachings of the art, the essential conditions being that the platinum compound be soluble therein, and that the solvent be capable of wetting the lubricant. We prefer to employ a liquid which will dissolve both the platinum compound and the lubricant. Satisfactory solvents include ketones such as acetone, methyl ethyl ketone, methyl isobutyl ketone, and the like; ethers, such as ethyl ether, isopropyl ether, butyl ether, ethylene glycol diethyl ether, and the like; and cyclic compounds, such as benzene, dioxane, tetrahydrofurfuryl alcohol, and the like. Our preferred solvents are the $C_1$–$C_5$ aliphatic alcohols, including methanol, ethanol, isopropyl alcohol, the butyl alcohols, isoamyl alcohol, and the like. The platinum solution may contain a small proportion of water (e.g., up to a few percent), so long as its wetting power for the pelleting lubricant is not thereby destroyed.

For the impregnation, it is convenient to employ a platinum solution in a quantity just sufficient to saturate the alumina pellets, and to adjust the concentration of platinum in the solution to produce a completed catalyst of the desired platinum content. Uniform impregnation with a minimum of operations is thereby facilitated.

In an advantageous embodiment of our invention, the initial drying of the alkali-aged alumina is carried out to a volatiles content less than about 25 percent by weight, wet basis; and the impregnation of the alumina, after pulverization and pelleting, is carried out with a platinum solution containing an aluminum halide dissolved therein, preferably aluminum chloride. The concentration of aluminum salt may suitably range upward from about 0.01 M to 0.3 M or more, depending upon the quantity of aluminum salt to be added to the catalyst. We prefer to employ a concentration and a quantity of solution sufficient to incorporate the aluminum salt in the catalyst in a molar ratio to the alumina between about 0.001:1 and 0.02:1. Catalysts of exceptionally high activity and mechanical strength are obtained in this way.

Our invention will be more fully understood from the following specific example:

A portion of Heard-type alumina hydrosol containing 5 percent by weight of $Al_2O_3$ was stirred and adjusted to a pH of approximately 11 by addition of the required quantity of aqueous 29 percent ammonium hydroxide. The mixture was thereafter allowed to stand at room temperature for a total period of 16 hours. The resulting slurry was filtered. The filter cake was dried in air at a temperature of 200° F. for 16 hours to a volatiles content of approximately 36 percent by weight, wet basis. The dried cake was crushed to pass 30 mesh, 4 percent by weight of Sterotex was added as a lubricant, and the mixture was formed into 1/8" x 1/8" pellets in a pilling machine. A 200-gram portion of the pellets (containing the lubricant) was impregnated with platinum to a level of 0.3 percent by weight, based on dry $Al_2O_3$, using 100 milliliters of an isoamyl alcohol solution containing chloroplatinic acid equivalent to 0.38 gram of platinum plus 1 gram of $AlCl_3.6H_2O$ (0.45 percent by weight $AlCl_3$ on $Al_2O_3$, dry basis). The impregnated pellets were dried at 220° F. for 16 hours and calcined in air at 1100° F. for 6 hours.

The completed catalyst was subjected to a hydroforming test under standardized conditions, employing 50 milliliters of catalyst in a quasi-isothermal reaction zone surrounded by an electrically heated block for temperature control. The tests were carried out at a catalyst outlet temperature of 920° F., a pressure of 200 pounds per square inch gage, an hourly weight space velocity of 2, and a once-through hydrogen rate of 5,000 standard cubic feeet per barrel of feed. The feed was a Mid-Continent virgin naphtha having an ASTM distillation range of 210 to 356° F., a CFR-R octane number of 44.0, an API gravity of 55.2°, a Reid vapor pressure of 1.1 pounds per square inch, and a composition consisting of 50.0 percent by volume of paraffins, a trace of olefins, 41.5 percent naphthenes, 8.5 percent aromatics, 0.028 weight-percent sulfur, and 0.01 percent nitrogen (Kjeldahl). The catalyst activity was calculated as the relative quantity, expressed as a percentage, of an arbitrarily chosen standard catalyst, containing 0.6 percent platinum, required to produce a $C_5+$ product fraction having the same octane number under the same test conditions. The results were as follows:

| Product Interval, hr. | Product Octane, CFR-R | Catalyst Activity |
|---|---|---|
| 0-20 | 97.9 | 185 |
| 20-40 | 98.5 | 179 |
| 40-60 | 97.3 | 145 |
| 60-80 | 98.5 | 102 |
| 80-100 | 94.5 | 81 |
| 100-120 | 93.7 | 75 |
| 120-140 | 93.4 | 73 |
| 140-160 | 93.0 | 72 |
| 160-180 | 92.6 | 70 |
| 180-200 | 91.8 | 66 |
| 200-220 | 92.3 | 67 |

Our improved catalysts are broadly useful in hydrocarbon-conversion reactions which are catalyzed by platinum. Specifically, our catalysts are useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art, as set forth above. Our catalysts are especially advantageous in the hydroforming of petroleum naphthas boiling in the range of about 200-400° F, and are capable of upgrading a 50 percent naphthenic naphtha having a CFR-R octane number of only 40 to 50 into a $C_5+$ gasoline having an octane number of 90 to 100 in a yield of 80 to 85 percent.

While we have described our invention with reference to certain specific embodiments thereof, it is to be understood that such embodiments are illustrative only and not by way of limitation. Numerous modifications and equivalents of our invention will be apparent from the foregoing description to those skilled in the art.

In accordance with the foregoing description, we claim as our invention:

1. A single-calcination method for preparing a pelleted alumina-supported platinum catalyst which comprises adding an alkaline substance to peptized alumina in a quantity sufficient to raise the pH thereof to a level within the range of about 8.5 to 12, maintaining the resulting mixture at a pH within said range and at a temperature between about 50 and 250° F. for a period in excess of about 1 hour, whereby said hydrosol is converted into a filterable slurry of solid, hydrous alumina, drying the treated alumina to a volatiles content between about 15 and 50 percent by weight, wet basis, crushing the dried alumina, incorporating a pelleting lubricant therein, forming the alumina into pellets, impregnating the pelleted alumina to a platinum level between about 0.05 and 1 percent by weight, based on dry $Al_2O_3$, with a solution of a platinum compound in an organic solvent capable of wetting said pelleting lubricant, and drying and calcining.

2. The method of claim 1 wherein said alkaline substance is ammonia.

3. The method of claim 1 wherein said alkaline substance is a water-soluble amine.

4. The method of claim 1 wherein said alkaline substance is an inorganic base.

5. A single-calcination method for preparing a pelleted platinum-alumina catalyst which comprises commingling an alumina hydrosol with a quantity of ammonia sufficient to raise the pH of the resulting mixture to a level within the range of about 8.5 to 12, maintaining the resulting mixture at a pH within said range and at a temperature between about 50 and 250– F. for a period in excess of about 24 hours, whereby said hydrosol is converted into a filterable slurry of solid, hydrous alumina drying the resulting alumina at a temperature below about 400° F. to a volatiles content between about 15 and 50 percent by weight, wet basis, crushing the dried alumina, incorporating between about 0.5 and 10 percent by weight of an organic pelleting lubricant therein, forming the alumina into pellets, impregnating the alumina pellets to a platinum level between about 0.05 and 1 percent by weight, based on dry $Al_2O_3$, with a solution of a platinum compound in an organic solvent for said platinum compound and said pelleting lubricant, and drying and calcining.

6. A single-calcination method for preparing a pelleted platinum-alumina catalyst which comprises commingling an alumina hydrosol with a quantity of aqueous ammonium hydroxide sufficient to raise the pH of the resulting mixture to a level within the range of about 10 to 11, maintaining the resulting mixture at a pH within said range and at a temperature between about 70 and 100° F. for a period of about 2 to 7 days, whereby said hydrosol is converted into a filterable slurry of solid, hydrous alumina, separating said solid, hydrous alumina from said slurry, drying said alumina at a temperature between about 200 and 400° F. to a volatiles content between about 15 and 40 percent by weight, wet basis, crushing the dried alumina, incorporating an organic pelleting lubricant therein, forming the alumina into pellets, impregnating the alumina pellets with a solution of a platinum compound in a $C_1$-$C_5$ aliphatic alcohol to a platinum level between about 0.05 and 1 percent by weight, based on dry $Al_2O_3$, and drying and calcining.

7. A singly calcined pelleted alumina-supported platinum catalyst, prepared by adding an alkaline substance to peptized alumina in a quantity sufficient to raise the pH thereof to a level within the range of about 8.5 to 12, maintaining the resulting mixture at a pH within said range and at a temperature between about 50 and 250° F.

for a period in excess of about 1 hour, whereby said hydrosol is converted into a filterable slurry of solid, hydrous alumina, separating solid, hydrous alumina from said slurry, drying the treated alumina to a volatiles content between about 15 and 50 percent by weight, wet basis, crushing the dried alumina, uniformly incorporating a pelleting lubricant therein, forming the lubricated alumina into pellets, uniformly impregnating the pelleted, lubricated alumina to a platinum level between about 0.05 and 1 percent by weight, based on dry $Al_2O_3$, with a solution of a platinum compound in an organic solvent capable of wetting said pelleting lubricant, and drying and calcining in the presence of air at a temperature of between about 800 and 1200° F., for a time sufficient for the removal of the lubricant.

8. A singly calcined pelleted platinum-alumina catalyst, prepared by commingling an alumina hydrosol with a quantity of ammonia sufficient to raise the pH of the resulting mixture to a level within the range of about 8.5 to 12, maintaining the resulting mixture at a pH within said range and at a temperature between about 50 and 250° F. for a period in excess of about 24 hours, whereby said hydrosol is converted into a filterable slurry of solid, hydrous alumina, filtering solid, hydrous alumina from said slurry, drying the filtered alumina at a temperature between about 150 and 400° F. to a volatiles content between about 15 and 50 percent by weight, wet basis, crushing the dried alumina, uniformly incorporating between about 0.5 and 10 percent by weight of an organic pelleting lubricant therein, forming the lubricated alumina into pellets, uniformly impregnating the lubricated alumina pellets to a platinum level between about 0.05 and 1 percent by weight, based on dry $Al_2O_3$, with a solution of a platinum compound in an organic solvent for said platinum compound and for said pelleting lubricant, and drying and calcining.

9. A hydrocarbon-conversion process wherein a hydrocarbon charging stock is contacted under conversion conditions with a singly calcined pelleted alumina-supported platinum catalyst, prepared by adding an alkaline substance to peptized alumina in a quantity sufficient to raise the pH thereof to a level within the range of about 8.5 to 12, maintaining the resulting mixture at a pH within said range and at a temperature between about 50 and 250° F. for a period in excess of about 1 hour, whereby said hydrosol is converted into a filterable slurry of solid, hydrous alumina, separating said solid, hydrous alumina from said slurry, drying the treated alumina to a volatiles content between about 15 and 50 percent by weight, wet basis, crushing the dried alumina, uniformly incorporating a lipophilic pelleting lubricant therein, forming the lubricated alumina into pellets, uniformly impregnating the pelleted lubricated alumina to a platinum level between about 0.05 and 1 percent by weight, based on dry $Al_2O_3$, with a solution of a platinum compound in an organic solvent capable of wetting said pelleting lubricant, and drying and calcining in air whereby the lubricant is removed.

10. A reforming process wherein a petroleum naphtha is contacted under hydroforming conditions with a singly calcined pelleted platinum-alumina catalyst, prepared by commingling an alumina hydrosol with a quantity of ammonia sufficient to raise the pH of the resulting mixture to a level within the range of about 8.5 to 12, maintaining the resulting mixture at a pH within said range and at a temperature between about 50 and 250° F. for a period in excess of about 24 hours, whereby said hydrosol is converted into a filterable slurry of solid, hydrous alumina, filtering solid, hydrous alumina from said slurry, drying the filtered alumina at a temperature between about 150 and 400° F. to a volatiles content between about 15 and 50 percent by weight, wet basis, crushing the dried alumina, uniformly incorporating between about 0.5 and 10 percent by weight of an organic pelleting lubricant capable of being dissolved by a $C_1$–$C_5$ aliphatic alcohol forming the lubricated alumina into pellets, uniformly impregnating the alumina pellets in the presence of the uniformly incorporated lubricant to a platinum level between about 0.05 and 1 percent by weight, based on dry $Al_2O_3$, with a substantial non-aqueous impregnating solution of a platinum compound dissolved in a $C_1$–$C_5$ aliphatic alcohol, and thereafter drying and calcining, whereby said lubricant and said alcohol are removed.

11. The method of claim 6 in which said solution has dissolved therein aluminum chloride in a concentration between about 0.01 to 0.3 M.

References Cited in the file of this patent

UNITED STATES PATENTS

| | | |
|---|---|---|
| 2,585,033 | Pitzer | Feb. 12, 1952 |
| 2,658,028 | Haensel et al. | Nov. 3, 1953 |
| 2,734,022 | Kimberlin et al. | Feb. 7, 1956 |
| 2,787,522 | Le Francois | Apr. 2, 1957 |
| 2,818,393 | Le Francois et al. | Dec. 31, 1957 |
| 2,840,529 | Le Francois | June 24, 1958 |